US012627894B2

(12) United States Patent
Kondo

(10) Patent No.: US 12,627,894 B2
(45) Date of Patent: May 12, 2026

(54) HEAD-WEARABLE VISUAL RECOGNITION APPARATUS

(71) Applicant: KONDO LABO, INC., Aichi (JP)

(72) Inventor: Takehito Kondo, Aichi (JP)

(73) Assignee: KONDO LABO, INC., Aichi (JP)

( * ) Notice: Subject to any disclaimer, the term of this patent is extended or adjusted under 35 U.S.C. 154(b) by 0 days.

(21) Appl. No.: 18/908,099

(22) Filed: Oct. 7, 2024

(65) Prior Publication Data

US 2025/0280202 A1 Sep. 4, 2025

(30) Foreign Application Priority Data

Mar. 1, 2024 (JP) ................................. 2024-031408

(51) Int. Cl.
*H04N 23/698* (2023.01)
*G02B 27/01* (2006.01)
*H04N 13/261* (2018.01)

(52) U.S. Cl.
CPC ....... *H04N 23/698* (2023.01); *G02B 27/0172* (2013.01); *H04N 13/261* (2018.05)

(58) Field of Classification Search
None
See application file for complete search history.

(56) References Cited

FOREIGN PATENT DOCUMENTS

| CN | 106154548 A | * | 11/2016 | ......... G02B 27/0176 |
| CN | 108885341 A | * | 11/2018 | ......... G02B 27/0101 |
| JP | H11-215411 A | | 8/1999 | |
| JP | 3231356 U | | 3/2021 | |
| JP | 7525136 B1 | | 7/2024 | |

* cited by examiner

*Primary Examiner* — Heather R Jones
(74) *Attorney, Agent, or Firm* — Rimon P.C.

(57) ABSTRACT

The present invention proposes a head-wearable visual recognition apparatus capable of widening a wearer's field of view. The head-wearable visual recognition apparatus includes: a pair of line-of-sight passing units attached to a head belt worn on the wearer's head; and a camera disposed adjacent to the one line-of-sight passing unit. The one line-of-sight passing unit includes a prism in a horizontally-long cuboid shape, through which the wearer's line of sight passes forward, and which refracts an optical axis of the camera to the front. The other line-of-sight passing unit includes a prism in a horizontally-long cuboid shape, through which the wearer's line of sight passes forward. According to such a configuration, it is possible to widen a field of view in a horizontal direction of each of the line-of-sight passing units through the prism and to improve workability of the wearer.

1 Claim, 6 Drawing Sheets

HEAD-WEARABLE VISUAL RECOGNITION APPARATUS

TECHNICAL FIELD

The present invention relates to a head-wearable visual recognition apparatus capable of capturing an image of an object seen by a wearer.

BACKGROUND ART

As disclosed in Patent Literature 1, the present inventors have proposed a head-wearable camera that uses a cubic prism arranged in front of a wearer's eyes to transmit the wearer's line of sight forward and refract an optical axis of a camera arranged on a side of the prism to match the line of sight. According to such a conventional configuration, an image of an object seen by the wearer can be captured with the wearer's line of sight. Thus, by displaying the image captured by the camera on an image display device such as a monitor, the object can be seen from the same line of sight as the wearer.

CITATION LIST

Patent Literature

Patent Literature 1: Japanese Utility Model Registration No. 3,231,356

SUMMARY OF INVENTION

Technical Problem

By the way, in the above-described conventional configuration, the wearer sees the object through the cubic prism. Thus, the wearer's field of view through the prism is determined by a size of the prism. This requires the wearer to move his/her head in order to view the outside of the field of view through the prism. Due to such a reason, in the configuration of seeing through the cubic prism, it is necessary to increase vertical and horizontal sizes of the prism to expand the field of view through the prism. However, since the increase in the size of the prism results in increased weight of the prism, which increases a burden on the wearer.

The present invention proposes a head-wearable visual recognition apparatus capable of widening a wearer's field of view while suppressing a burden on the wearer due to increased weight.

Solution to Problem

The present invention is a head-wearable visual recognition apparatus including: a head-wearing section worn on a wearer's head; a line-of-sight passing member that is attached to the head-wearing section and through which at least one of left and right lines of sight of the wearer passes forward; and imaging means disposed adjacent to the line-of-sight passing member and capable of capturing an image of an object through the line-of-sight passing member. The line-of-sight passing member includes a prism in a horizontally-long cuboid shape through which the wearer's line of sight passes forward and which refracts an optical axis of the imaging means forward.

In such a configuration, since the horizontally-long prism is provided, it is possible to widen the wearer's field of view in the horizontal direction through the prism. Since human vision is generally wider in the horizontal direction than in an up-down direction, the horizontally-long prism widens the wearer's field of view. Thus, it is possible to improve use comfort and dramatically improve workability of the wearer. In addition, compared to the above-described conventional cubic prism that is increased in size, the horizontally-long prism in this configuration is at least smaller in a vertical size and thus is lighter. Accordingly, it is possible to suppress a burden on the wearer by weight of the prism, and such a head-wearable visual recognition apparatus is suitable for use over a relatively long time.

Furthermore, since the horizontally-long prism widens a range within which the wearer can move his/her eyes (line of sight) in the horizontal direction, this contributes to improvement in the workability and improvement in use comfort. Here, a human eye generally has a wider range of movement and is easier to move in the horizontal direction than in the vertical direction (up-down direction), there is a superior advantage that the wearer can easily feel an improved effect of the workability and use comfort.

In the above-described head-wearable visual recognition apparatus of the present invention, such a configuration is proposed that t the prism of the line-of-sight passing member has a horizontally-long cuboid shape in which two right-angled prisms are integrated by superimposing oblique surfaces thereof, each of which is inclined downward or upward to the front, and is provided with transmission and reflection means, which divides light incident from the front into transmitted light passing therethrough to the rear and reflected light reflected upward or downward, and that the imaging means is disposed above or under the prism, and the optical axis is refracted forward by the oblique surface of the prism.

Here, in the case where the prism is formed of the right-angled prism having the oblique surface inclined downward to the front, the transmission and reflection means on the oblique surface divides the light incident from the front into the transmitted light and the reflected light reflected upward. For this reason, the imaging means is disposed above the prism. Meanwhile, in the case where the prism is formed of the right-angled prism having the oblique surface inclined upward to the front, the transmission and reflection means on the oblique surface divides the light incident from the front into the transmitted light and the reflected light reflected downward. For this reason, the imaging means is disposed under the prism.

In such a configuration, the transmitted light that has passed through the prism of the line-of-sight passing member is received by the wearer, and the reflected light reflected on the oblique surface of the prism is received by the imaging means. Thus, the imaging means can capture the image of the object seen by the wearer. Here, since the imaging means is provided to oppose a horizontally-long upper surface or lower surface of the prism, it is possible to capture the image that is substantially the same as the wearer's field of view in the horizontal direction through the prism by adjusting an angle of view according to the width of this upper surface or lower surface. In this way, a person who sees the image captured by the imaging means can have substantially the same view as the wearer.

In such a configuration of the present invention, since the imaging means captures the image of the object (so-called mirror image) projected on the oblique surface of the prism, the image captured by the imaging means and the image seen by the wearer differ in the up-down direction or the left-right direction. For this reason, in the present invention, such a configuration is preferred that includes means for executing data processing on image data (hereinafter referred to as data processing means) such that the up-down and left-right directions of the image data captured by the imaging means match those of the object seen by the wearer. According to such a configuration, when the image data, which is processed by the data processing means, is output and displayed on the image display device such as the monitor, a person who sees the image display device can have the same view as the wearer.

Furthermore, the present invention can be configured to include processing means that converts the image data captured by the imaging means into data that can be output as a stereoscopic image (three-dimensional image). Here, such a configuration is preferred that includes both of the processing means for conversion into the stereoscopic image and the data processing means for matching the up-down and left-right directions.

Advantageous Effects of Invention

The head-wearable visual recognition apparatus in the present invention can expand the wearer's field of view in the horizontal direction through the horizontally-long prism and can improve the workability of the worker. In addition, since it is possible to suppress weight increase by the prism, it is possible to suppress the burden on the wearer by the weight increase, and thus the head-wearable visual recognition apparatus is suitable for use over a relatively long time.

DESCRIPTION OF EMBODIMENTS

A description will be made on an embodiment that embodies the present invention with reference to the accompanying drawings. In the embodiment, a front-rear direction indicates a front-rear direction of a wearer who wears a head-wearable visual recognition apparatus 1 of the embodiment, and a left-right direction indicates a left-right direction of the wearer as well. This left-right direction indicates a lateral direction, and an up-down direction of the wearer indicates a vertical direction. Furthermore, in the embodiment, a front surface and a frontal surface are used with the same meaning.

Figure 1:
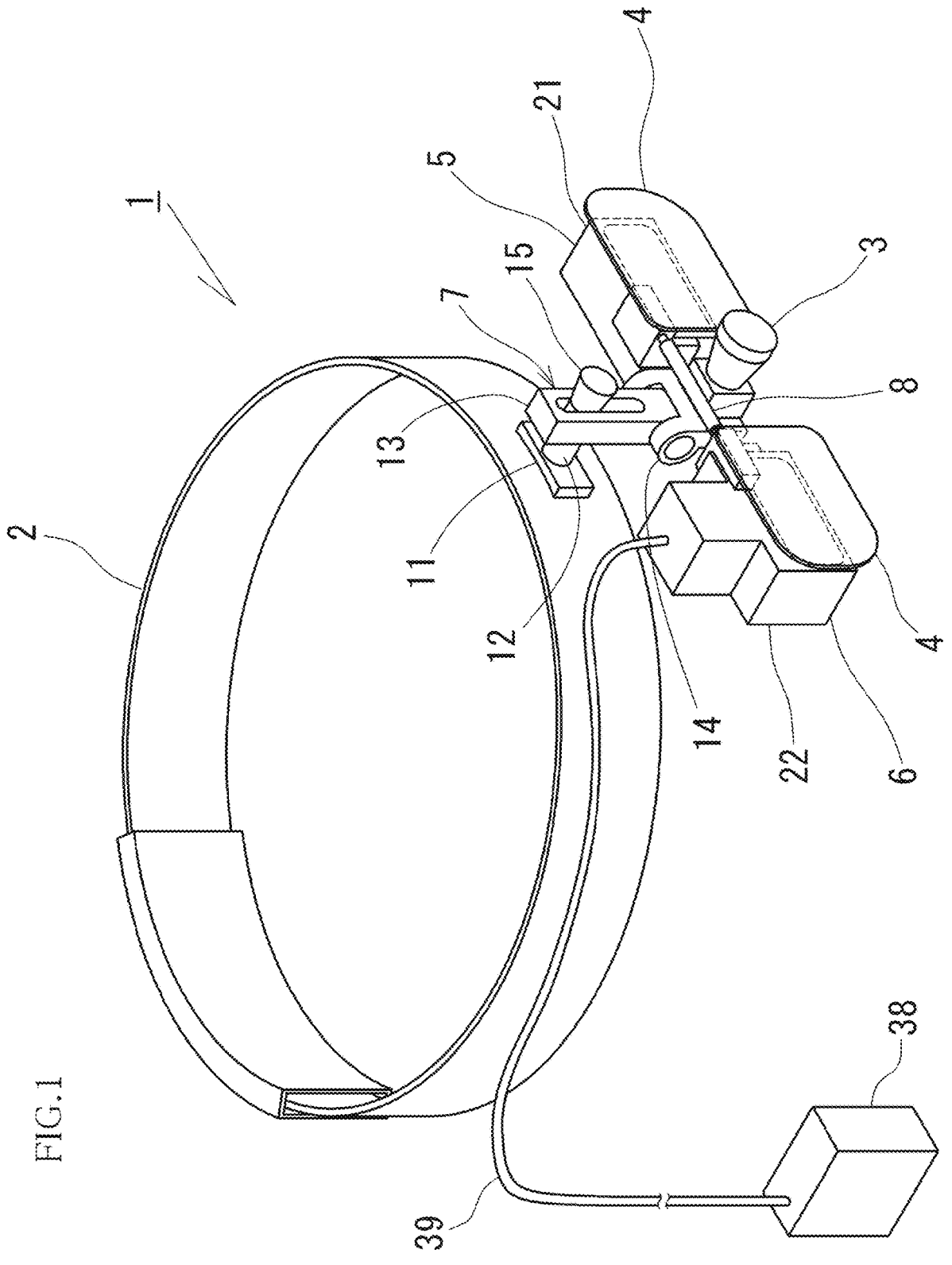
FIG. 1 is a perspective view illustrating a head-wearable visual recognition apparatus 1 of an embodiment.

As illustrated in FIGS. 1 and 2, the head-wearable visual recognition apparatus 1 of this embodiment includes: a head belt 2 worn on the wearer's head; a lighting member 3 attached to a front central portion of the head belt 2 via a coupling member 7; left and right loupes 4, 4 attached to the coupling member 7 via a support member 8; and left and right line-of-sight passing units 5, 6 attached to the support member 8. The loupes 4, 4 and the line-of-sight passing units 5, 6 are provided integrally.

A circumferential size of the head belt 2 is adjustable, and this adjustment allows the head belt 2 to fit the wearer's head. The loupe 4 is substantially plate-shaped. Since a conventionally known configuration can be applied to each of these head belt 2 and loupe 4, a detailed description thereon will be omitted. The head belt 2 corresponds to the head-wearing section in the present invention.

The coupling member 7 includes: a base section 11 fixed to the head belt 2; a protruding rod 12 protruding forward from the base section 11; a sliding section 13 provided with a vertically elongated hole through which the protruding rod 12 is inserted; and an attachment section 14 provided in a lower end portion of the sliding section 13 in a manner to be tiltable in the vertical direction. A positioning section 15 is screwed to a distal end of the protruding rod 12. By fastening the positioning section 15, a vertical position of the sliding section 13 relative to the protruding rod 12 can be fixed. Meanwhile, by unfastening the positioning section 15, the sliding section 13 can be moved vertically relative the protruding rod 12.

The lighting member 3 is attached to the attachment section 14, and the loupes 4, 4 and the line-of-sight passing units 5, 6 are also attached thereto via the support member 8. The support member 8 allows the loupes 4, 4 and the line-of-sight passing units 5, 6 to tilt with respect to the attachment section 14 (and the lighting member 3). These lighting members 3, loupes 4, 4, and line-of-sight passing units 5, 6 can be moved integrally in the vertical direction and positioned and fixed at a desired vertical position by the coupling member 7. Then, these lighting members 3, loupes 4, 4, and line-of-sight passing units 5, 6 can be tilted integrally in the vertical direction with respect to the sliding section 13 by the attachment section 14. Furthermore, the loupes 4, 4 and the line-of-sight passing units 5, 6 can be tilted integrally with respect to the attachment section 14 and the lighting member 3 by the support member 8. Here, in this embodiment, the left and right loupes 4, 4 are arranged adjacent to each other right in front of the left and right line-of-sight passing units 5, 6, respectively.

The lighting member 3 includes an LED light. A cable that supplies electric power to the LED light is connected to the lighting member 3, and a power supply and a switch are also connected thereto via the cable (not illustrated). This lighting member 3 can illuminate an object seen through the line-of-sight passing units 5, 6, thereby improving visibility of the object.

Figure 2A:
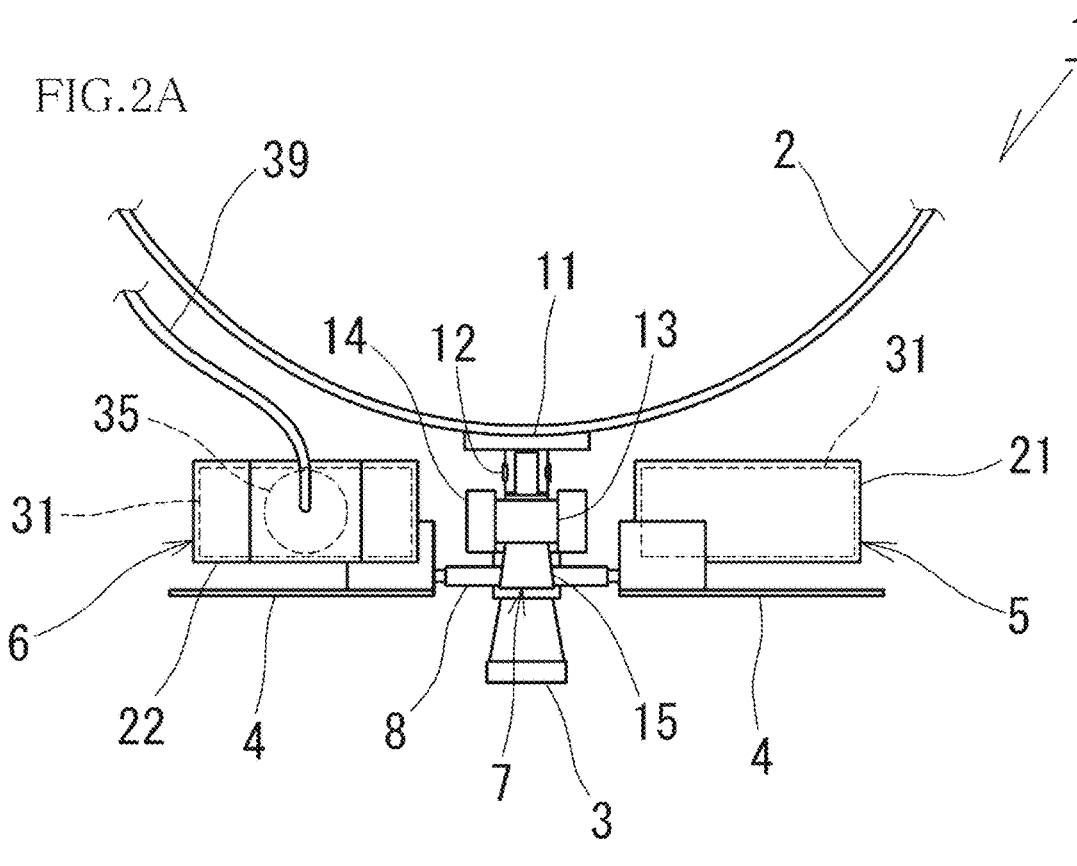
FIG. 2A is a plan view of the head-wearable visual recognition apparatus 1.
Figure 2B:
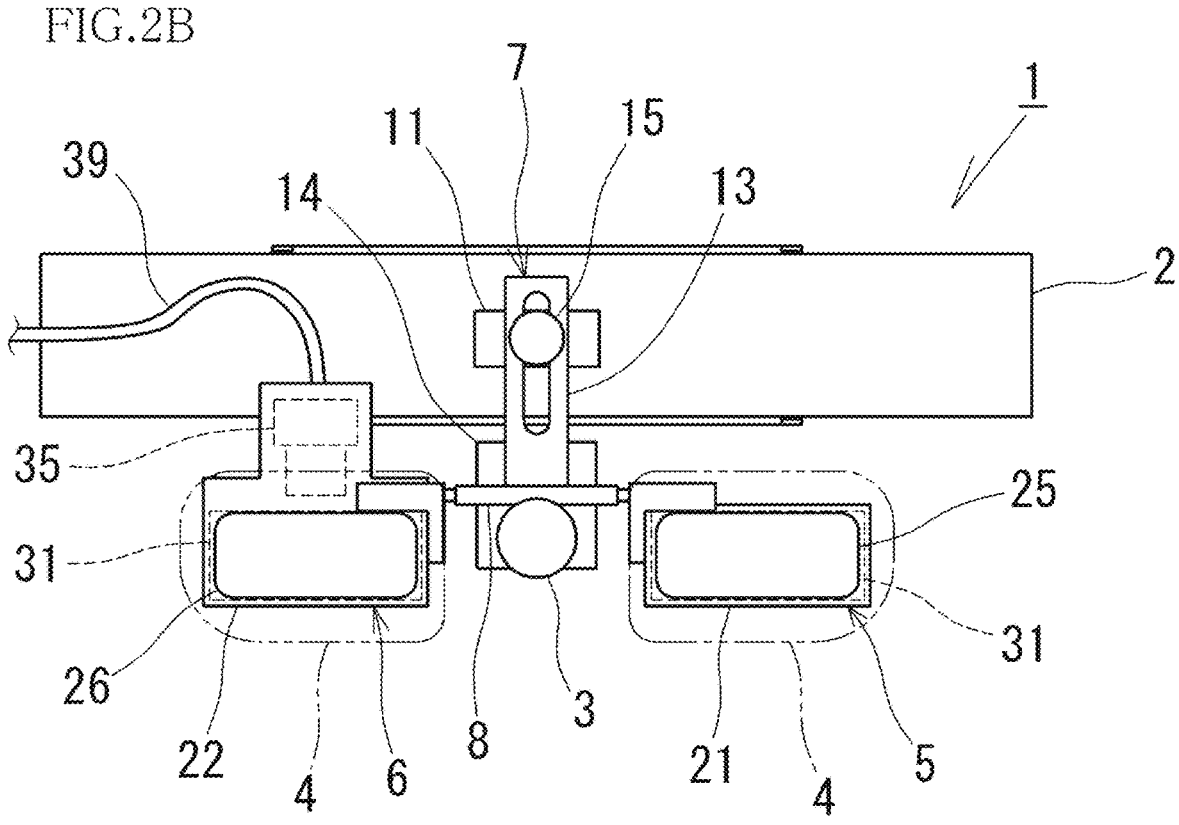
FIG. 2B is a front view of the head-wearable visual recognition apparatus 1 from which a loupe 4 is omitted.

Next, a description will be made on the line-of-sight passing units 5, 6, which are essential components of the present invention. As illustrated in FIGS. 1, 2A, and 2B, the left and right loupes 4, 4 and the line-of-sight passing units 5, 6 are fixed to left and right sides of the support member 8, respectively. The left line-of-sight passing unit 5 includes a casing 21 and a prism 31 disposed in the casing 21. The right line-of-sight passing unit 6 includes a casing 22 as well as a prism 31 and a camera 35 disposed in the casing 22. The line-of-sight passing unit 6 corresponds to the line-of-sight passing member in the present invention, and the camera 35 corresponds to imaging means in the present invention.

Figure 3A:
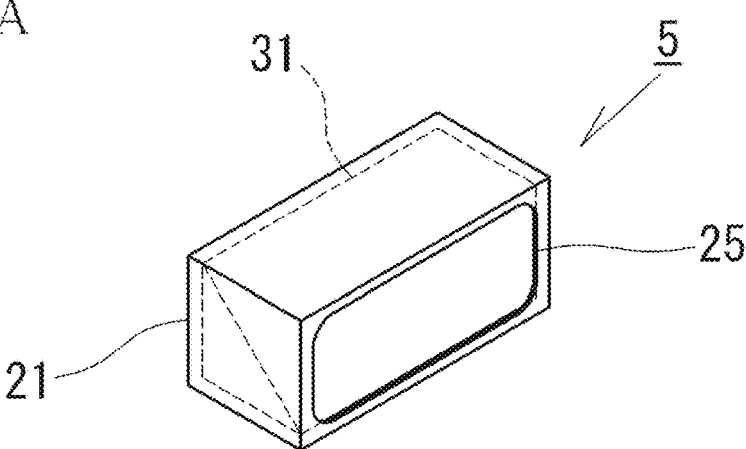
FIG. 3A is a perspective view of a left line-of-sight passing unit 5 that is seen from the front.
Figure 3B:
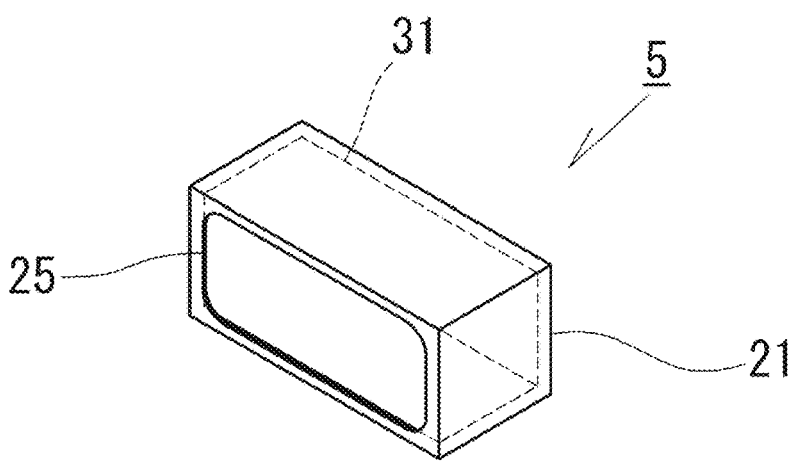
FIG. 3B is a perspective view of the left line-of-sight passing unit 5 that is seen from behind.
Figure 3C:
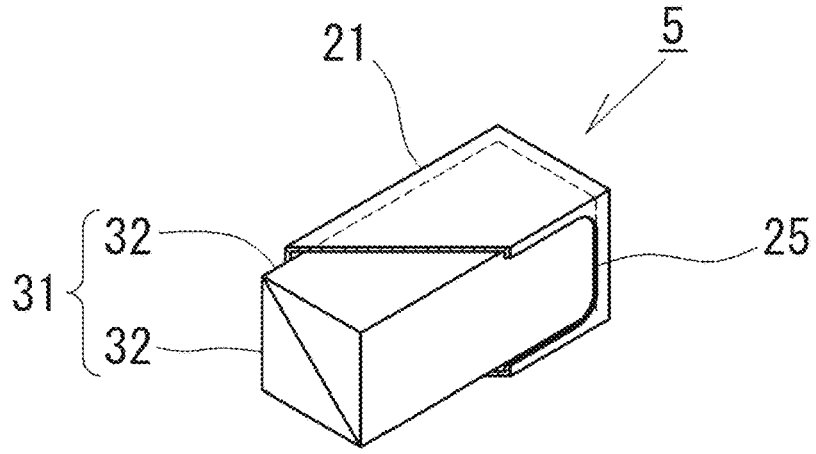
FIG. 3C is a perspective view of the left line-of-sight passing unit 5 in which a casing 21 is partially cut out and that is seen from the front.

As illustrated in FIGS. 3A, 3B, and 3C, the casing 21 that constitutes the left line-of-sight passing unit 5 has a substantially cuboid shape that is long in the left-right direction, and accommodates the prism 31. This casing 21 is formed with windows 25, 25 in a front surface portion and a rear surface portion thereof in a manner to be opened opposite to each other. These windows 25, 25 are provided to face a front surface and a rear surface of the prism 31 disposed in the casing 21. In this way, the substantially entire front surface of the prism 31 in the casing 21 is exposed to the front through the window 25 in the front surface portion, and the substantially entire rear surface of the prism 31 in the casing 21 is exposed to the rear through the window 25 in the rear surface portion.

Figure 4A:
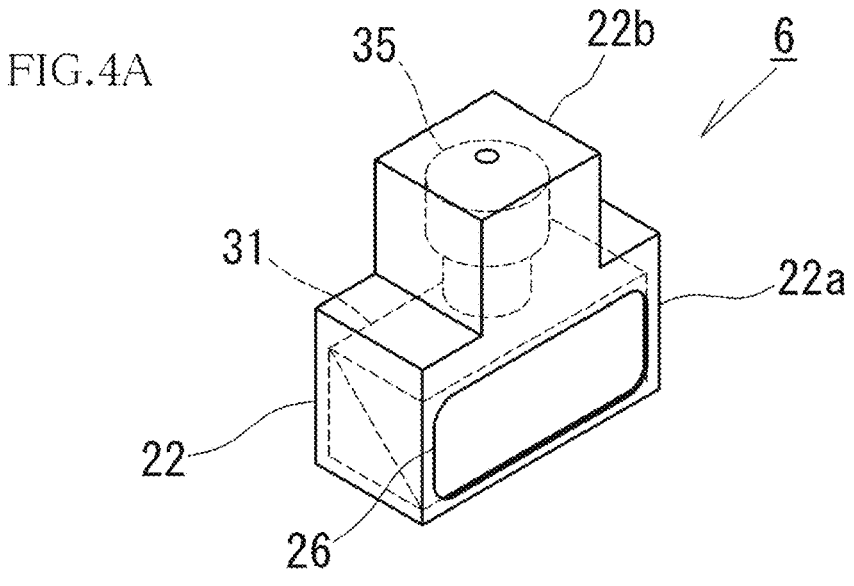
FIG. 4A is a perspective view of a right line-of-sight passing unit 6 that is seen from the front.
Figure 4B:
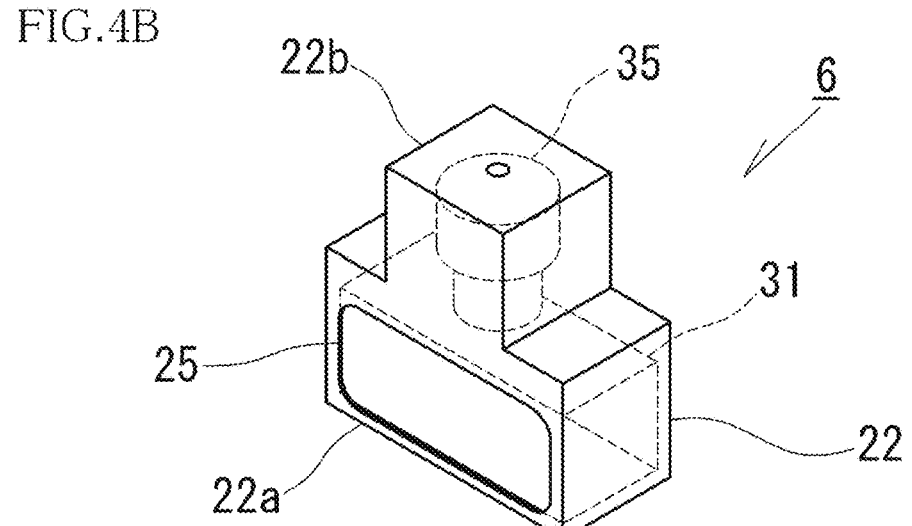
FIG. 4B is a perspective view of the right line-of-sight passing unit 6 that is seen from behind.
Figure 4C:
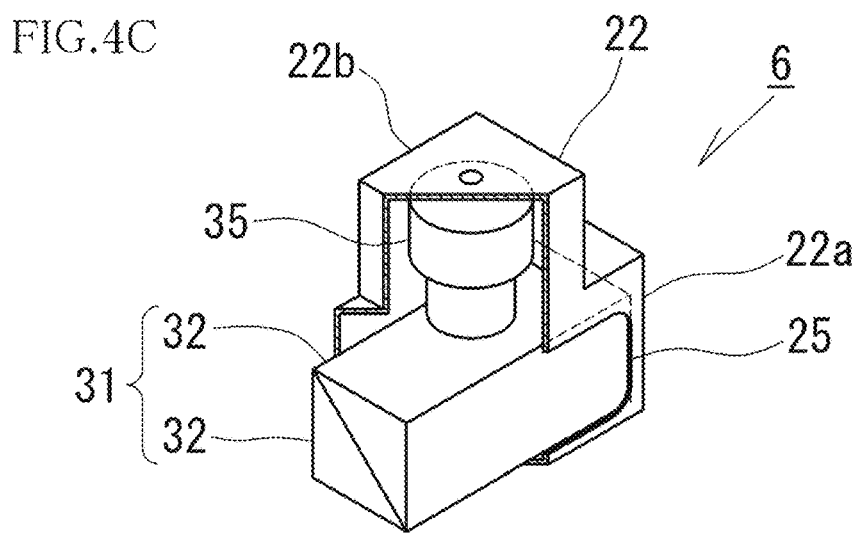
FIG. 4C is a perspective view of the right line-of-sight passing unit 6 in which a casing 22 is partially cut out and that is seen from the front.

As illustrated in FIGS. 4A, 4B, and 4C, the casing 22 that constitutes the right line-of-sight passing unit 6 is configured by: a main body section 22a having a substantially cuboid shape that is long in the left-right direction; and a protruding section 22b that protrudes upward from the main body section 22a and has a substantially cuboid shape. The inside of the main body section 22a communicates with the inside of the protruding section 22b. The prism 31 is accommodated inside the main body section 22a, and the camera 35 is accommodated inside the protruding section 22b. Similar to the above-described left casing 21, the main body section 22a is formed with windows 26, 26 in a front surface portion and a rear surface portion thereof in a manner to be opened opposite to each other. Similar to the left casing 21, these windows 26, 26 are provided to respectively face the front surface and the rear surface of the prism 31 disposed in the main body section 22a of the casing 22. In this way, the substantially entire front surface of the prism 31 in the casing 22 is exposed to the front through the window 26 in the front surface portion, and the substantially entire rear surface of the prism 31 in the casing 22 is exposed to the rear through the window 26 in the rear surface portion.

Here, the left and right loupes 4, 4, which are respectively arranged right in front of the line-of-sight passing units 5, 6, are formed to be larger than the windows 25, 26 in the front surface portions of the casings 21, 22, and are arranged to cover entire areas of the windows 25, 26 from the front.

Figure 5A:
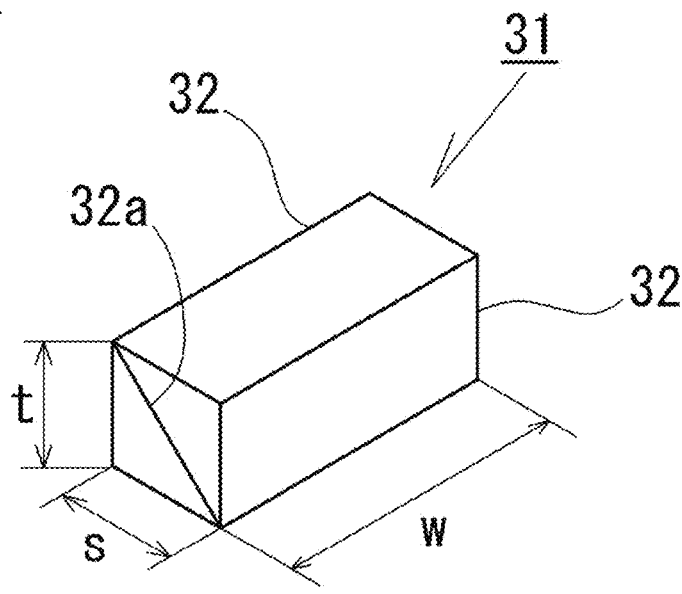
FIG. 5A is a perspective view of a prism 31.
Figure 5B:
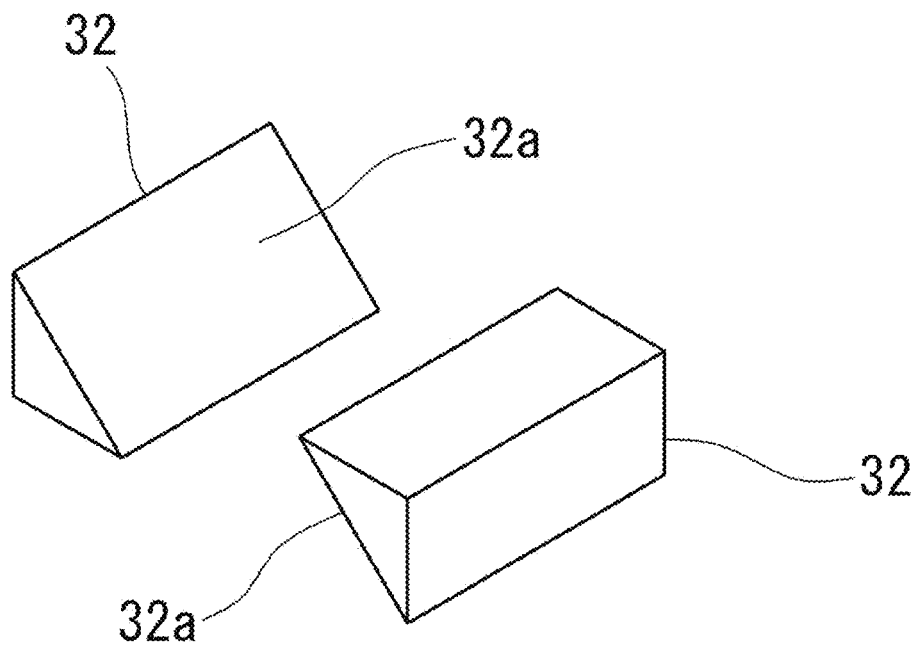
FIG. 5B is an exploded perspective view of the prism 31.

As illustrated in FIGS. 5A and 5B, each of the prisms 31 arranged in the casings 21, 22 has the cuboid shape in which two right-angle prisms 32, 32 are joined to each other by superimposing oblique surfaces 32a, 32a on each other, and is a so-called beam splitter. Here, in the right-angled prism 32, a width w between the two opposing surfaces of right triangles is longer than a base length (front-rear length of the prism 31) s and a height (vertical height of the prism 31) t of each of the opposing surfaces. In a state where the oblique surfaces 32a are inclined downward to the front, the prism 31, which includes these two right-angled prisms 32, 32, is disposed in each of the casings 21, 22 (see FIGS. 3A, 3B, 3C, 4A, 4B, and 4C).

The prism 31 has a mirror coating on the oblique surface 32a of the right-angled prism 32, which constitutes the prism 31, with transmittance (transparency) of 20 to 50%. The right prism 31 (line-of-sight passing unit 6) has an antireflection coating on the front surface, the rear surface, and an upper surface thereof, and has a black coating on the other three surfaces (left and right surfaces and a lower surface) to suppress light input and output. Meanwhile, the left prism 31

(line-of-sight passing unit 5) has the antireflection coating on the front surface and the rear surface thereof, and has a black coating on the other four surfaces (left and right surfaces, an upper surface, and a lower surface) to suppress the light input and output. The mirror coating on the oblique surface 32a of the right-angled prism 32 corresponds to the transmission and reflection means according to the present invention.

The camera 35 that is disposed to the right line-of-sight passing unit 6 is configured by a CCD camera. As illustrated in FIGS. 4A, 4B, 4C, the camera 35 is disposed in the protruding section 22b of the casing 22 such that a camera lens opposes the upper surface of the prism 31 disposed in the main body section 22a of the casing 22. Here, in regard to the camera 35, at least a maximum angle of view is set according to the width of the prism 31 such that light incident through the prism 31 is projected on an imaging element.

In these line-of-sight passing units 5, 6, the incident light from the loupes 4, 4, which are respectively arranged right in front of the line-of-sight passing units 5, 6, enters the prisms 31, 31 through the windows 25, 26 of the respective casings 21, 22. The incident light that has entered the prisms 31, 31 is divided into: transmitted light passing through the slopes 32a, 32a of the prisms 31, 31; and reflected light reflected upward on the oblique surfaces 32a, 32a. The wearer can visually recognize the transmitted light, which has passed through the prisms 31, 31 just as described, through the windows 25, 26 of the respective casings 21, 22. In the right line-of-sight passing unit 6, the reflected light, which is reflected on the oblique surface 32a of the prism 31, is projected on the imaging element through the lens of the camera 35. That is, the oblique surface 32a of the prism 31 refracts an optical axis of the camera 35 forward. In this way, the camera 35 can capture an image in the wearer's field of view through the horizontally-long prism 31.

Here, in this embodiment, it is configured that the wearer can visually recognize the transmitted light that has passed through the prism 31 provided in the left line-of-sight passing unit 5. Since the same prisms 31, 31 are provided to the left and right line-of-sight passing units 5, 6 as described above, it is possible to suppress the wearer from having a sense of discomfort due to images reflected in the wearer's left and right eyes through the respective prisms 31, 31.

As illustrated in FIG. 1, the camera 35 is connected to a cable 39, and is connected to a controller 38 through the cable 39. The controller 38 transmits and receives, through the cable 39, a signal instructing the camera 35 to capture an image and image data captured by the camera 35, and also supplies the electric power to the camera 35. With a wireless communication function, this controller 38 can then transmit the image data, which is input from the camera 35, via a network. Furthermore, the controller 38 in this embodiment includes data processing means that processes the image data such that the up-down and left-right directions of the image data input from the camera 35 are aligned with those of the image seen by the wearer. Here, since the camera 35 captures an image (mirror image) reflected on the oblique surface 32a of the prism 31 from above, the up-down direction or the left-right direction of the captured image differ from those of the image seen by the wearer (the image seen through the oblique surface 32a). The data processing means executes the data processing to appropriately convert the up-down and left-right directions of the image data captured by the camera 35 to make the up-down and left-right directions match those of the image seen by the wearer. The controller 38 outputs the image data, which has been processed by this data processing means, by the wireless communication function. In this way, when the image data (data of the still or moving image) transmitted by the wireless communication function is projected onto an image display device such as a monitor, the up-down and left-right directions of the image displayed on the image display device match those of the image seen by the wearer with the line-of-sight passing units 5, 6.

Since any of the conventionally known data processing means can be applied as the data processing means, a detailed description thereon will not be made. For example, Wi-Fi®, Bluetooth®, or the like can be applied as the wireless communication function.

In the head-wearable visual recognition apparatus 1 of this embodiment, the head belt 2 is worn on the wearer's head, the left and right line-of-sight passing units 5, 6 are positioned right in front of both eyes of the wearer, and the wearer can see the magnified object. The left and right eyes of the wearer see the object through the prisms 31, 31 and the loupes 4, 4 of the line-of-sight passing units 5, 6, respectively. That is, the line of sight of the left eye passes through the left prism 31 and the left loupe 4 to reach the object, and the line of sight of the right eye passes through the right prism 31 and the right loupe 4 to reach the object.

Figure 6B:
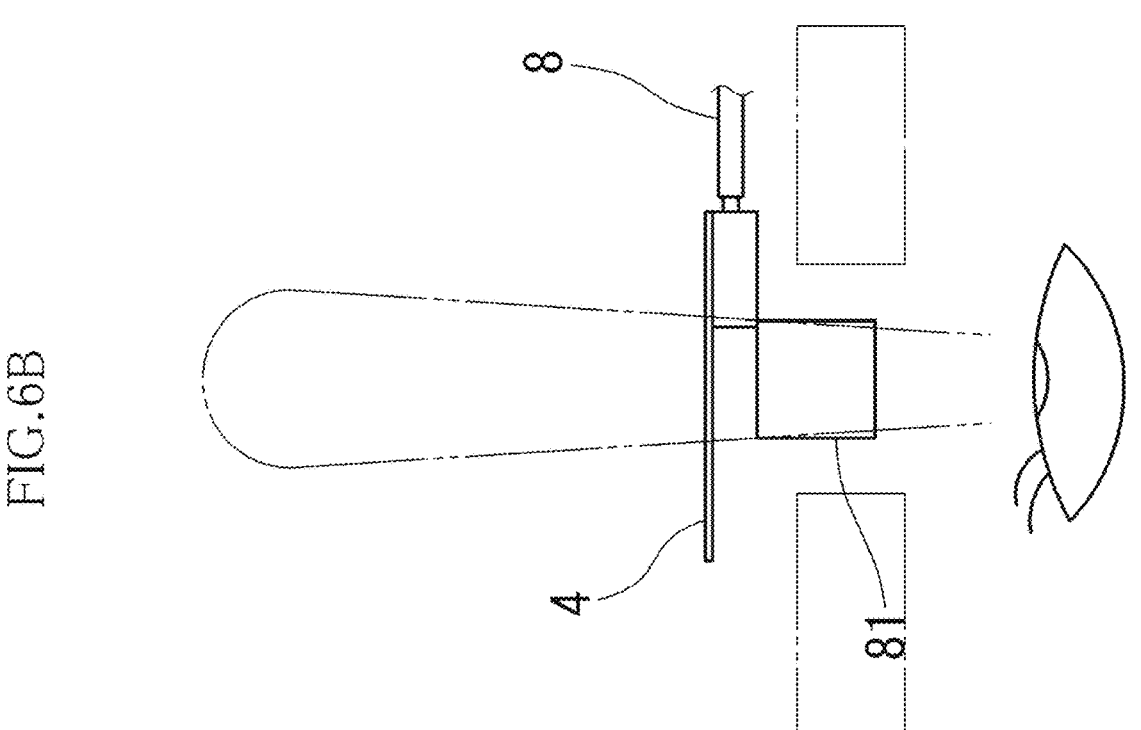
FIG. 6B is a view illustrating the wearer's field of view with a configuration using a cubic prism 81.
Figure 6A:
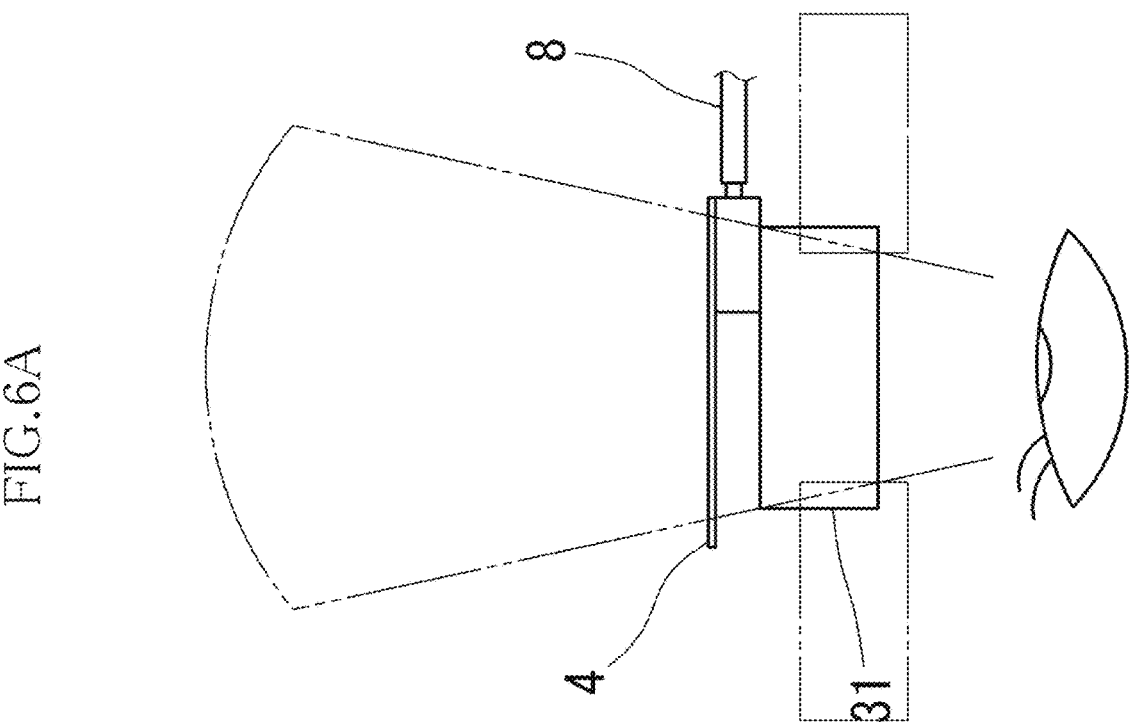
FIG. 6A is a view illustrating a wearer's field of view with the head-wearable visual recognition apparatus 1.

Here, since the left and right line-of-sight passing units 5, 6 are each configured to include the prism 31 in the horizontally-long cuboid shape as described above, as illustrated in FIG. 6A, the field of view in the left-right direction is widened according to the widths of the prisms 31 (widths of the windows 25, 26 of the casings 21, 22). Meanwhile, in the conventional configuration that includes a cubic prism 81, as illustrated in FIG. 6B, a width of the cubic prism 81 is shorter than that of the prism 31 in this embodiment. Accordingly, in the configuration of this embodiment, the wearer's field of view in the left-right direction is wider than that in the conventional configuration. In addition, in this embodiment, the wearer can move his or her own line of sight in the left-right direction within a range of the width of the prism 31. In other words, a range within which the line of sight can be moved in the left-right direction is also wider than that of the above-described cubic prism 81. Here, this conventional configuration is the same as the configuration in the embodiment except for the prism 81, and the prism 81 in the conventional configuration has the cubic shape in which the height thereof is the same as that of the prism 31 in this embodiment and in which the height and the width are the same.

As described above, the angle of view of the camera 35 in the line-of-sight passing unit 6 can be set according to the width of the prism 31. Thus, the image can be captured in the wearer's field of view.

As described above, the head-wearable visual recognition apparatus 1 in this embodiment is configured to include the prisms 31, 31 in the horizontally-long cuboid shapes. Thus, the wearer's field of view in the left-right direction is widened according to the width of the prism 31, and the range within which the wearer can move his/her line of sight in the left-right direction is increased. This can improve workability of the wearer. In addition, since the height of the prism 31 in the horizontally-long cuboid shape is shorter than the cubic prism having the same width (in other words, the same field of view), weight of the prism 31 is reduced. As a specific example, in the case where the width w of the prism 31 in this embodiment is twice the height t, and the front-rear length s is the same as the height t, the prism 31 weighs about ¼ of the cubic prism 81 with the same width. Just as described, the configuration in this embodiment contributes to weight reduction, can reduce a burden on the wearer, and is suitable for use over a relatively long time in comparison with the case where the cubic prism with the same field of view in the left-right direction is used.

Furthermore, in the camera 35 of the line-of-sight passing unit 6, the optical axis thereof is refracted forward by the prism 31 (oblique surface 32a) to the object through the loupe 4, and the angle of view thereof is set according to the width of the prism 31. In this way, substantially the same range as the wearer's field of view in the left-right direction can be imaged via the horizontally-long prism 31.

In the configuration of this embodiment, the controller 38 outputs (transmits) the image data captured by the camera 35 such that the up-down and left-right directions thereof match those of the image seen by the wearer. Thus, by projecting the output image data (data of the still or moving image) on the monitor, a person seeing that monitor can see the same image as that seen by the wearer.

The present invention is not limited to the above-described embodiment, and can be appropriately modified within the scope that does not depart from the gist of the present invention. For example, the dimensional shape of each section in the above-described embodiment can be appropriately modified.

The head-wearable visual recognition apparatus in the embodiment is configured to provide the camera to the right line-of-sight passing unit. However, it may be configured to provide the camera to the left line-of-sight passing unit. Alternatively, it may be configured to provide the camera to both of the left and right line-of-sight passing units.

The head-wearable visual recognition apparatus in the embodiment is configured to include the horizontally-long prism that includes the right-angled prism having an oblique surface inclined downward to the front. However, the head-wearable visual recognition apparatus in the embodiment may be configured to include a horizontally-long prism that includes a right-angled prism having an oblique surface inclined upward to the front. In this configuration, since the light that enters the prism from the front is reflected downward on the oblique surface, the camera is disposed under the prism.

The head-wearable visual recognition apparatus in the embodiment is configured to provide the loupes right in front of the line-of-sight passing units. However, the head-wearable visual recognition apparatus is not limited thereto and may be configured to provide the loupes right behind the line-of-sight passing units.

The head-wearable visual recognition apparatus in the embodiment is configured to include the head belt that is worn on the head. However, the head-wearable visual recognition apparatus is not limited thereto and may be of a type that is worn over ears such as an eyeglass frame.

The head-wearable visual recognition apparatus in the embodiment is configured that the controller having the wireless communication function includes the data processing means to convert the up-down and left-right directions of the image data. However, the head-wearable visual recognition apparatus is not limited thereto and may be configured that the camera includes this data processing means. Here, when the camera is also configured to have the wireless communication function, the camera can directly transmit the image data, the up-down and left-right directions of which have been converted.

In the embodiment, the head-wearable visual recognition apparatus is configured to include the data processing means that converts the up-down and left-right directions of the image data. However, the head-wearable visual recognition apparatus is not limited thereto, and a receiver, the image display device (monitor), or the like may include the data processing means. Here, the receiver receives the image data (data before conversion) transmitted from the controller. When the receiver or the image display device includes the data processing means, just as described, a system including these devices and the head-wearable visual recognition apparatus is provided.

In the embodiment, the controller may be configured to include the processing means that converts the image data captured by the camera into data that can be output as a stereoscopic image (three-dimensional image), in addition to the data processing means. Alternatively, it may be configured that the camera includes this processing means, or it may be configured that the receiver, the image display device, or the like includes the processing means, the receiver receiving the image data transmitted from the controller.

REFERENCE SIGNS LIST

1: head-wearable imaging visual recognition apparatus
2: head belt
5, 6: line-of-sight passing unit
31: prism
32: right-angled prism
32a: oblique surface
35: camera

The invention claimed is:

1. A head-wearable visual recognition apparatus comprising:
- a head-wearing section configured to be worn on a wearer's head;
- a line-of-sight passing member that is attached to the head-wearing section and through which a line of sight of at least one of the wearer's left and right eyes passes forward; and imaging means disposed adjacent to the line-of-sight passing member and configured to capture an image of an object through the line-of-sight passing member, wherein the line-of-sight passing member includes a prism having a horizontally-long cuboid shape through which the line of sight of at least one of the wearer's left and right eyes passes forward and which refracts an optical axis of the imaging means forward, wherein a horizontal direction of the horizontally-long cuboid shaped prism of the line-of-sight passing member coincides with a left-right direction of the wearer's field of view, and allows the wearer to move the wearer's own line of sight in the left-right direction within a range of a width of the horizontally-long cuboid shaped prism, wherein a height of the horizontally-long cuboid shaped prism is shorter than a height of a cubic prism having a same width as the horizontally-long cuboid shaped prism, wherein the horizontally-long cuboid shaped prism of the line-of-sight passing member includes two right-angled prisms that are integrated by superimposing oblique surfaces of the two right-angled prisms, each of the oblique surfaces being inclined downward or upward toward a front of the horizontally-long cuboid shaped prism, wherein the horizontally-long cuboid shaped prism is provided with transmission and reflection means, which divides light incident from the front into transmitted light passing through the horizontally-long cuboid shaped prism toward a rear of the horizontally-long cuboid shaped prism and reflected light directed upward or downward, and wherein the imaging means is disposed above or under the horizontally-long cuboid shaped prism, and an optical axis of the imaging means is refracted forward by the oblique surface of the horizontally-long cuboid shaped prism.

* * * * *